(12) United States Patent
Wakutani et al.

(10) Patent No.: US 6,289,883 B1
(45) Date of Patent: Sep. 18, 2001

(54) EXHAUST GAS RECIRCULATION CONTROL SYSTEM FOR ENGINE

(75) Inventors: Shinichi Wakutani; Yuji Matsuo, both of Hiroshima (JP)

(73) Assignee: Mazda Motor Corporation, Hiroshima-Ken (JP)

( * ) Notice: Subject to any disclaimer, the term of this patent is extended or adjusted under 35 U.S.C. 154(b) by 0 days.

(21) Appl. No.: 09/553,260

(22) Filed: Apr. 20, 2000

(30) Foreign Application Priority Data

Apr. 23, 1999 (JP) .................................................. 11-116735

(51) Int. Cl.$^7$ .................................................. F02M 25/07
(52) U.S. Cl. .............................. 123/568.21; 123/568.12; 123/399
(58) Field of Search ....................... 123/361, 399, 123/478, 568.11, 568.12, 568.21, 568.26; 701/108; 60/605.2

(56) References Cited

U.S. PATENT DOCUMENTS

| | | | |
|---|---|---|---|
| 4,763,264 | * | 8/1988 | Okuno et al. .......................... 123/478 |
| 6,016,788 | * | 1/2000 | Kibe et al. ......................... 123/568.21 |
| 6,039,025 | * | 3/2000 | Iwano et al. ............................ 123/399 |
| 6,079,387 | * | 6/2000 | Mamiya et al. ................. 123/568.26 |

FOREIGN PATENT DOCUMENTS

| | | |
|---|---|---|
| 08193534 | 7/1996 | (JP) . |
| 10-184408-A * | 7/1998 | (JP) . |
| 10-339191-A * | 12/1998 | (JP) . |
| 11-351068-A * | 12/1999 | (JP) . |

* cited by examiner

Primary Examiner—Willis R. Wolfe
(74) Attorney, Agent, or Firm—Brooks & Kushman P.C.

(57) ABSTRACT

An exhaust gas recirculation control system for bringing an actual amount of air that is detected by an air flow sensor to a target value by feedback controlling a valve lift of an EGR valve throttles down a throttle valve immediately before an exhaust gas inlet port of an intake passage when a large amount of exhaust gas is intended to be recirculated. When the largest actual amount of air is reduced due to closing the throttle valve, the target amount of air is changed smaller so as to ensure the actual amount of air to reach the target value through the feedback control.

8 Claims, 5 Drawing Sheets

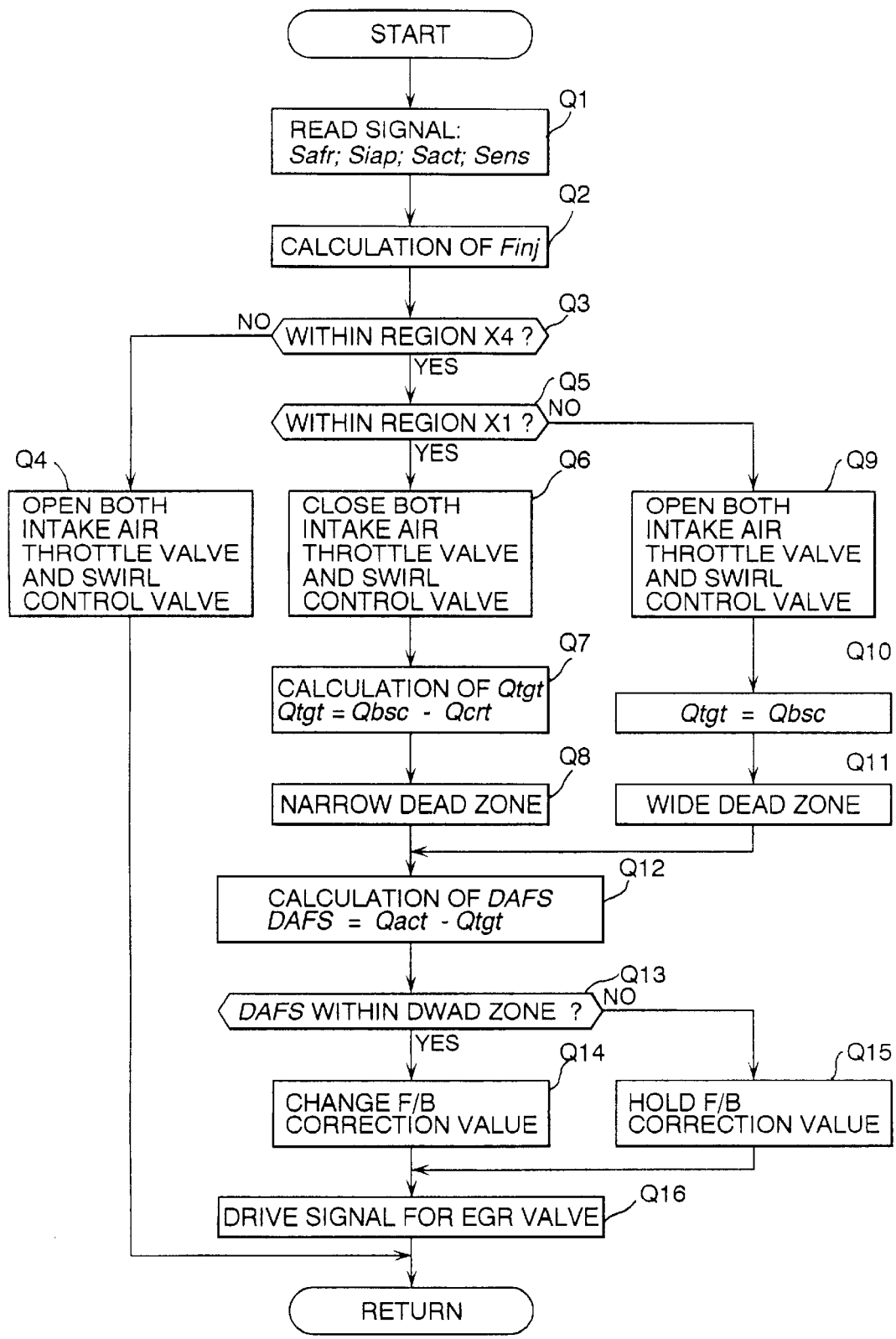

EXHAUST GAS RECIRCULATION CONTROL SYSTEM FOR ENGINE

BACKGROUND OF THE INVENTION

1. Field of the Invention

The present invention relates to an exhaust gas recirculation system for an engine.

2. Description of the Related Art

In recent years, engines, in particular diesel engines, are equipped with an exhaust gas recirculation system for recirculating a large amount of exhaust gas into an intake air stream. In order to admit a large amount of exhaust gas into an air stream, there have been proposed exhaust gas recirculation systems equipped with an intake air throttle valve located in an intake path upstream an exhaust gas inlet port. The intake air throttle valve operates in a closing direction in a region of engine operating conditions in which recirculation of a large amount of exhaust gas is demanded so as to reduce an effective aperture of intake air passage with the result of increasing negative pressure acting at the exhaust gas inlet port of the intake path so as to intensify suction of exhaust gas into the intake air path. One of such exhaust gas recirculation systems is known from, for example, Japanese Unexamined Patent Publication 8-193534. Further, because recirculation of a large amount of exhaust gas causes aggravation of combustibility, feedback control of the amount of exhaust gas recirculation is implemented to bring a ratio of the amount of exhaust gas recirculation is feedback controlled to bring a ratio of the amount of exhaust gas relative to an amount of fresh air that is introduced into the intake air path to a specified ratio by controlling an amount of intake air that is actually detected by an air flow meter so as to bring it to a target value.

In the exhaust gas recirculation system which is equipped with an intake air throttle valve operative to increase the amount of exhaust gas recirculation, it was ascertained that, when closing the intake air throttle valve or, in particular, fully closing the intake air throttle valve so as to provide a smallest effective aperture of intake air path with the intention to increase the amount of exhaust gas recirculation, there possibly occurs such a situation that the amount of exhaust gas recirculation is made zero in an excessive case. As a result of having pursued causes of an occurrence of this situation, it has been proven that fully closing the intake air throttle valve imposes restraints on the largest amount of air which is actually introduced and, as a result of which, the actual amount of air becomes too smaller than the target amount of air. That is to say, the feedback control of the recirculation amount of exhaust gas function to reduce the recirculation amount of exhaust gas so as to increase the actual amount of air, and the exhaust gas recirculation finally comes to a standstill. The present invention has its object to provide an exhaust gas recirculation system for an engine which feedback controls a recirculation amount of exhaust gas so as to bring an amount of air that is actually introduced to a target amount of air with a certain effect of reflecting an increase in the recirculation amount of exhaust gas.

SUMMARY OF THE INVENTION

The foregoing object of the present invention is accomplished by an exhaust gas recirculation control system of a type having an intake air throttle valve between an air flow sensor operative to detect an actual amount of air introduced into an intake air passage and an exhaust gas inlet port of the intake air passage through which exhaust gas is admitted into an intake air stream for feedback controlling a recirculation amount of exhaust gas so as to bring an actual amount of intake air to a target amount of air, the exhaust gas recirculation system being characterized by changing an operated condition of the intake air throttle valve when an engine operating condition falls in an engine operating region specified for implementation of feedback control of the recirculation amount of exhaust gas, and changing the target amount of air according to the operated condition of the intake air throttle valve. The target amount of air is determined to be small for a smaller valve lift of the intake air throttle valve as compared with a larger valve lift of the intake air throttle valve.

The valve lift of the intake air throttle valve is reduced in a specified engine operating region for an increase in exhaust gas recirculation amount, which may be predetermined for lower engine speeds or lower engine loads, or otherwise both lower engine speeds and lower engine loads. Further, the target amount of air may be reduced by an amount of air that occurs due to a reduction in valve lift of the intake air throttle valve.

According to the exhaust gas recirculation of the present invention, an amount of air that is actually introduced reliably reaches a target amount of air during the feedback control of the recirculation amount of exhaust gas by changing the target amount of air according to a valve lift of the intake air throttle valve that has a strong effect on the actual amount of air, so as to provide an effect of reflecting an increase in the recirculation amount of exhaust gas by controlling the intake air throttle valve. This effect is more reliably secured by making the target amount of air small for a smaller valve lift of the intake air throttle valve as compared with a larger valve lift of the intake air throttle valve.

An increase in the recirculation amount of exhaust gas is made certain by reducing a valve lift of the intake air throttle valve in a specified engine operating region where an increase in exhaust gas recirculation amount is intended, specifically in a region for lower engine speeds or lower engine loads, or for both lower engine speeds and lower engine loads where there is a strong demand for lowering a level of NOx emissions.

Reducing the target amount of air by an amount of air that occurs due to a reduction in valve lift of the intake air throttle valve is desirable in the viewpoint of making a reduction in the target amount of air as small as possible, which is always desirable for an increase in air utilization factor for combustion.

BRIEF DESCRIPTION OF THE DRAWINGS

The above and other objects and features of the present invention will be clearly understood from the following detailed description in connection with the preferred embodiments thereof when reading in conjunction with the accompanying drawings, in which:

FIG. 6 is a flow chart illustrating a sequence routine of exhaust gas recirculation control.

DETAILED DESCRIPTION OF THE PREFERRED EMBODIMENTS

Figure 1:
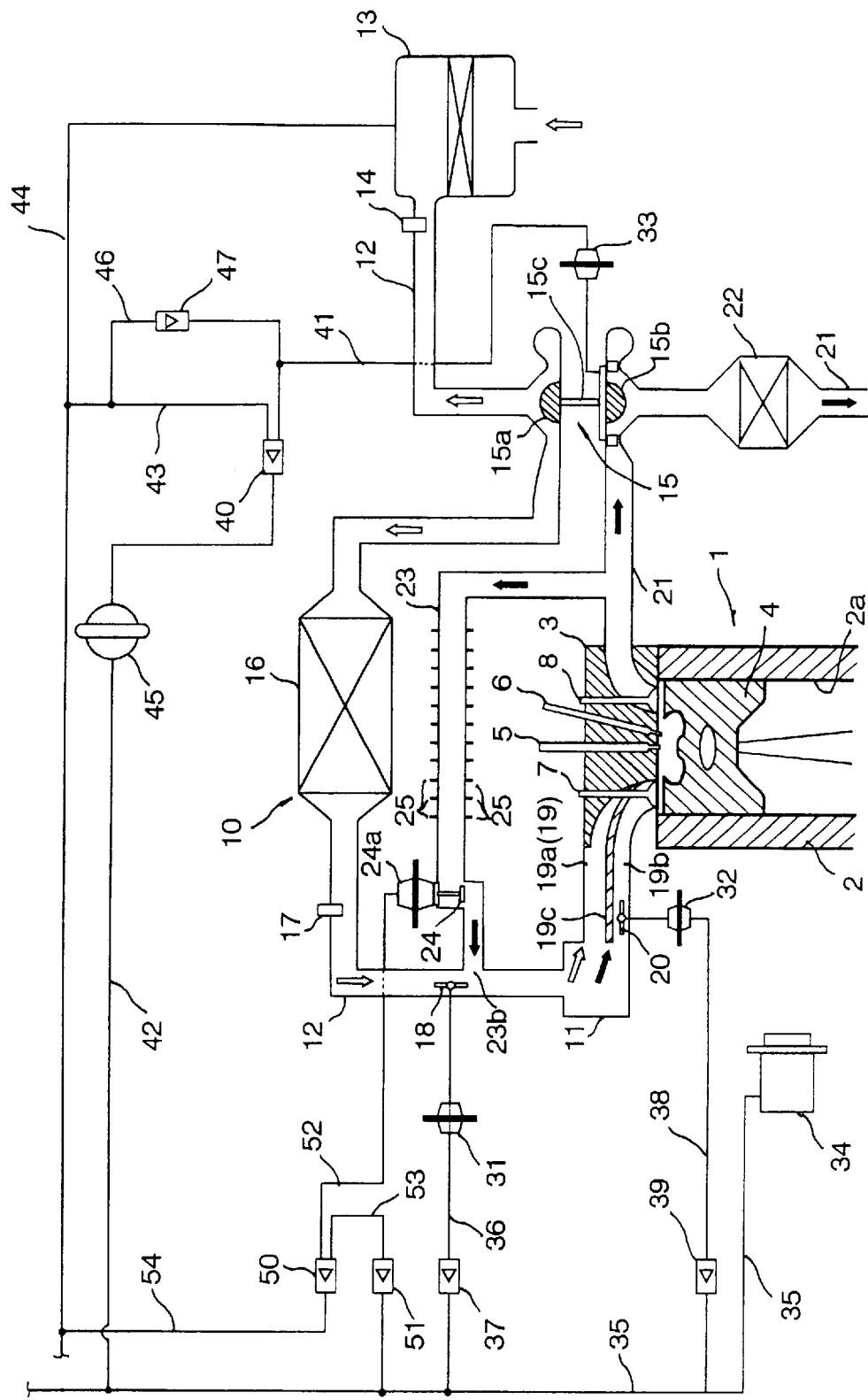
FIG. 1 is a system diagram showing an overall structure of an exhaust gas recirculation system in accordance with a preferred embodiment of the present invention.

Referring to the drawings in detail and, in particular, to FIG. 1, there is shown ;an exhaust gas recirculation system in accordance with a preferred embodiment of the present invention which is installed to a direct injection type of multi-cylinder diesel engine 1. This diesel engine 1 has a cylinder block 2 and cylinder head 3. The cylinder block 2 is formed with a plurality of cylinder bores 2a (only one of which is shown) in which pistons 4 are received. The cylinder head 3 is provided with a fuel injector 5 installed therein so as to extend down in a combustion chamber formed between the cylinder bore 2a and an under wall of the cylinder head 3 and a glow plug 6 adjacent to the fuel injector 5 so as to protrude into a precombustion chamber. The fuel injector 5 sprays fuel directly into the combustion chamber. The Further, the cylinder head 3 is further provided with two intake valves 7 (only one of which is shown) and two exhaust valves 8 (only one of which is shown) for each cylinder 2a to open and close intake ports and exhaust ports, respectively, at appropriate timing.

Air is introduced into the engine 1 through an intake passage 10 having a surge tank 11. The intake passage 10 comprises a common intake air passage 12 upstream from the surge tank 11 and discrete intake passages 19 downstream from the surge tank 11. The common intake air passage 12 is provided, in order from the upstream side to the downstream side, with an air cleaner 13, an air flow meter 14 that detects an amount of fresh air introduced into the common intake air passage 12, a compressor wheel 15a that forms a part of a turbosupercharger 15 which is of a type variable in supercharging efficiency, an inter-cooler 16, an intake air pressure sensor 17 operative as a supercharged air pressure sensor, and an intake air throttle valve 18 operative as first intake air control means which will be described later. The intake air throttle valve 18 is of a type of holding the common intake air passage 12 open with a certain small aperture even when it is fully closed. The discrete intake air passages 19 connect the surge tank 11 to the combustion chambers, respectively. Each discrete intake air passage 19 is divided side by side by a partition 10c into two branch discrete intake air passages 19a and 19b. One of the branch discrete intake air passage 19a opens to the combustion chamber with the center line thereof directed almost tangential to the cylinder bore 2a so as to form a swirl of air in the combustion chamber. Another branch discrete intake air passage 19b is provided with a swirl control valve 20 as second intake air control means which is operative to block completely off the branch discrete intake air passage 19b when closes and, in consequence, to force air in its entirety into the combustion chamber through the branch discrete intake air passage 19a with the result of producing an intensified swirl of air (a great amount of air stream). The intake valves 7 open and close the discrete intake air passages 19a and 19b, respectively. Exhaust gas is discharged through an exhaust gas passage 21 which is provided, in order from the upstream side to the downstream side, with a variable nozzle type of turbine wheel 15b that forms a part of the turbosupercharger 15 and a preliminary exhaust gas catalytic converter 22. The exhaust gas is directed to a main exhaust gas catalytic converter (not shown) after passing through the preliminary exhaust gas catalytic converter 22 and discharged through a silencer (not shown). The turbine wheels 15a and 15b of the turbosupercharge 15 are coupled together for integral rotation by means of a turbine shaft 15c. The exhaust gas is partly recirculated into the common intake air passage 12 through an exhaust gas recirculation (EGR) passage 23. The amount of exhaust gas that is recirculated (which is hereafter referred to as the exhaust gas recirculating amount) is controlled by an exhaust gas recirculation (EGR) valve 24 equipped with a negative pressure operated actuator 24a disposed in EGR 23. As shown, EGR passage 23 has an inlet port 23a that opens to the exhaust gas passage 21 upstream from the turbine wheel 15b and an outlet port 23b that opens to the common intake air passage 12 between the intake air throttle valve 18 and the surge tank 11. In this instance, EGR passage 23 is provided with external cooling fins 25 for cooling exhaust gas arranged along a specified length between EGR valve 24 and the exhaust gas passage 21.

The intake air throttle valve 18 is actuated by a negative pressure operated actuator 31 to open and close. Similarly, the swirl control valve 20 is actuated by a negative pressure operated actuator 32 to open and close. The turbosupercharger 15 is controlled to vary its surpercharging efficiency by a negative pressure operated actuator 33. EGR valve 24 is operated with negative pressure. In order to operate these negative pressure operated valves, i.e. the negative pressure operated actuators 31–33 and EGR valve 24, an engine operated vacuum pump 34 is provided. A negative pressure supply passage 35 which is always supplied with negative pressure by the vacuum pump 34 is connected to the negative pressure operated actuator 31 through a pressure passage 36 with an electromagnetic switching valve 37 connected thereto. The switching valve 37, which is of an on-off type, admits negative pressure to the negative pressure operated actuator 31 through the negative pressure supply passage 35 so as to close the intake air throttle valve 18 while it is on, or causes the negative pressure operated actuator 31 to open to the atmosphere so as to open the intake air throttle valve 18 while it is off. The negative pressure operated actuator 32 is connected to the negative pressure supply passage 35 through a pressure passage 38 with an electromagnetic switching valve 39 connected thereto. The switching valve 39, which is of an on-off type, admits negative pressure to the negative pressure operated actuator 32 through the negative pressure supply passage 35 so as to close the swirl control valve 20 while it is on, or causes the negative pressure operated actuator 32 to open to the atmosphere so as to open the swirl control valve 20 while it is off. The negative pressure operated actuator 33 is of a linearly variable type and is accordingly connected to a duty-controlled electromagnetic regulator valve 40 such as a three-way valve through a pressure passage 41. The duty-controlled electromagnetic regulator valve 40 is connected to the negative pressure supply passage 35 through a pressure passage 42 and also to an atmosphere pressure passage 44 extending from the air cleaner 13 through a pressure passage 43. The pressure passage 41 is provided with a negative pressure reservoir 45. The duty-controlled electromagnetic regulator valve 40 is actuated to vary linearly the ratio between connection or disconnection of a pressure flow from the pressure passage 41 to or from the pressure passage 42 and connection or disconnection of a pressure flow from the pressure passage 41 to or from the pressure passage 43, so as to vary linearly the supercharging efficiency or supercharging capacity of the turbosupercharger 15. The pressure passage 41 is connected to the atmosphere pressure passage 44 through a bypass pressure passage 46 provided with an electromagnetic on-off valve 47. The negative pressure operated actuator 33 operates such as to increase the supercharging capacity of the turbosupercharger 15 with an increase in negative pressure that the negative pressure operated actuator 33 receives, so as to decline the supercharging capacity of the turbosupercharger 15 at a stretch in fine response to actuation of the electromagnetic on-off valve 47.

EGR valve 24 is controlled to vary its valve lift by duty-controlled electromagnetic regulator valves 50 and 51. The duty-controlled electromagnetic regulator valve 50, which is a three-way valve, is connected to the negative pressure operated actuator 24a of EGR valve 24 through a pressure passage 52, the negative pressure supply passage 35 through a pressure passage 53, and the atmosphere pressure passage 44 through a pressure passage 54. The duty-controlled electromagnetic regulator valve 51 is connected to the pressure passage 53. The duty-controlled electromagnetic regulator valve 50 is operative to vary linearly the ratio between connection or disconnection of a pressure flow from the pressure passage 52, and hence from the actuator 24a of the EGR valve 24, to or from the pressure passage 53 and connection or disconnection of a pressure flow from the pressure passage 41 to or from the pressure passage 52, and the duty-controlled electromagnetic regulator valve 51 is operative to regulate linearly negative pressure that is supplied to the duty-controlled electromagnetic regulator valve 50. The higher the negative pressure that is supplied to the actuator 24a of the EGR valve 24 is, the larger EGR valve 24 opens, that is, the larger the exhaust gas recirculating amount is. When the duty-controlled electromagnetic regulator valve 50 operates to bring the pressure passage 52 in communication with the atmosphere pressure passage 44 through the pressure passage 54 only, EGR valve 24 closes at a stretch in fine response to the communication.

Figure 2:
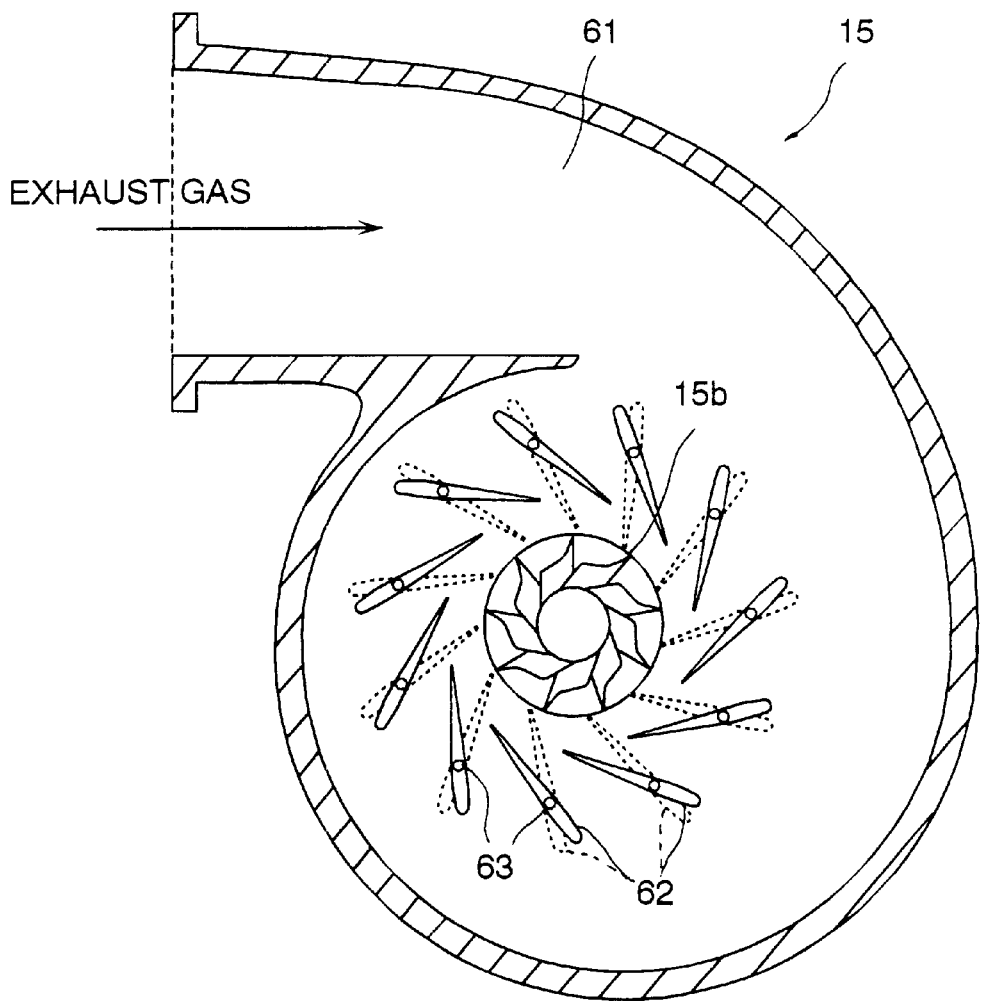
FIG. 2 is an enlarged cross-sectional view of a part of a turbosupercharger for changing a supercharging capacity.

Referring to FIG. 2 which shows a the supercharging capacity regulating mechanism of the turbosupercharger 15, in a scroll or volute casing 61 there are a number of variable vanes 62 arranged at regular angular intervals around the turbine wheel 15b so as to form variable nozzles between respective adjacent vanes 62. Each variable vane 62 is actuated by the actuator 3 to turn on a shaft 63, so as to change a direction of an exhaust gas flow with respect to the turbine wheel 15b. For example, an exhaust gas flow impinges more vigorously against the turbine wheel 15b when the vane 62 is at a large angle with respect to the turbine wheel 15b as shown by broken line than when the vane 62 is at a small angle with respect to the turbine wheel 15b as shown by solid line. As is well known, the more vigorously the exhaust gas flow is, the higher the supercharging capacity is. The turbosupercharger 15 may have a waste gate valve type of turbine wheel in place of the variable nozzle type of turbine wheel 15b.

Figure 3:
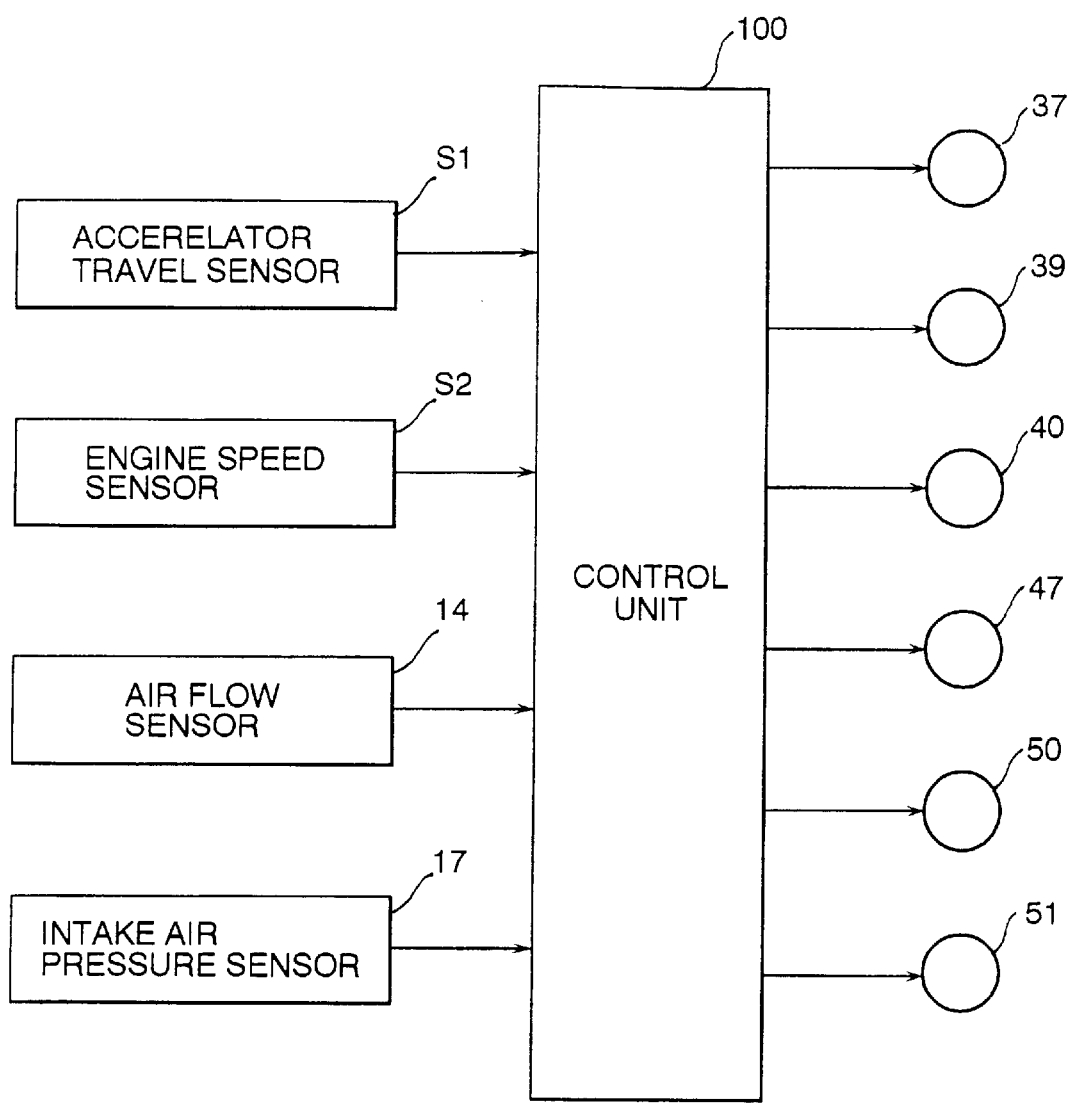
FIG. 3 is a block diagram illustrating a control system of the exhaust gas recirculation system.

The exhaust gas recirculation system is controlled by a control unit 100 schematically shown in FIG. 3.

As shown in FIG. 3, the control unit 100, which comprises a microcomputer, receives various signals, namely at least a signal of air flow rate Safr from the air flow meter 14, a signal of intake air pressure Siap from the intake air pressure sensor 17, a signal of accelerator travel Sact from an accelerator travel sensor S1, and a signal of engine speed Sens from an engine speed sensor S2, and provides control signals for the electromagnetic valves 37, 39, 40, 57, 50 and 51, respectively. In order for the control unit 100 to perform exhaust gas recirculation control, there is predetermined four engine operating regions X1–X4 with respect to engine speed, engine load and the injection amount of fuel Finj as parameters as shown by way of example in FIG. 4. The four engine operating regions X1–X4 are stored in the form of an engine operating region decision map in the control unit 100. The relationship to control of the intake air throttle valve 18 and the swirl control valve 20, control of exhaust gas recirculation and control of the amount of supercharging pressure is predetermined for each engine operating region as stated below These engine operating regions may be determined differently from those shown in FIG. 4.

Each of the intake air throttle valve 18 and the swirl control valve 20 is controlled to close in the engine operating region X1 and to open in each of the engine operating regions X2, X3 and X3. EGR valve 24 is feedback controlled in valve lift so as to provide a target amount of air Qtgt that is detected by the air flow meter 14 in the engine operating region X1 and is stopped in operation to interrupt exhaust gas recirculation in each of the engine operating regions X3 and X4. Supercharging is implemented in all of the engine operating regions X1–X4. Specifically, the efficiency of the turbosupercharger 15 is feedback controlled in the engine operating region X4 or forward controlled control in each of the engine operating regions X1–X3 so as to bring actual supercharging pressure that is detected by the intake air pressure sensor 17 to a target supercharging pressure.

Figure 4:
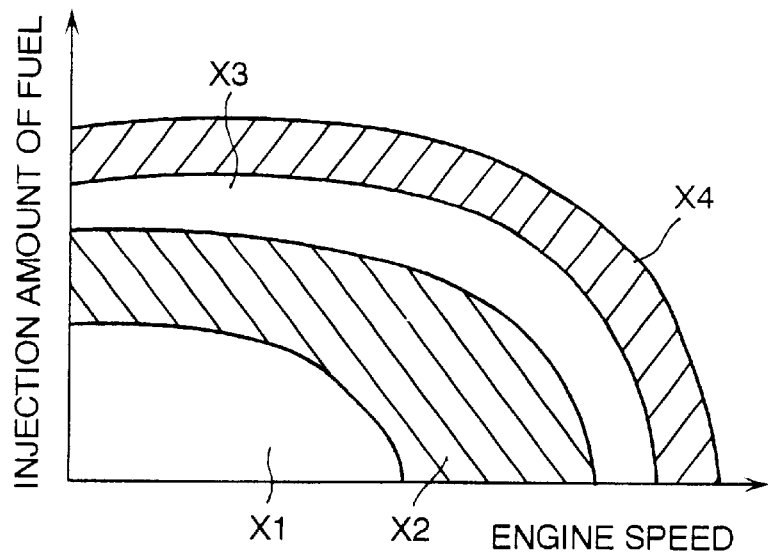
FIG. 4 is a map for exhaust gas recirculation control.

In the feedback control of exhaust gas recirculation amount, a dead zone in which a feedback control value is not renewed or a previous feedback control value is held is provided for engine operating conditions when a difference between the actual amount of air Qqct and a target amount of air Qtgt is smaller than a specified level as shown in FIG. 4. The dead zone, or the specified level for the difference, is changed according to a parameter relating to pulsation of intake air, the greater the intake air pulsation, the broader the dead zone. In this instance, the dead zone is determined to be wider in consideration of greater pulsation of intake air while the intake air throttle valve 10 or the swirl control valve 20 opens than while it closes.

Figure 5:
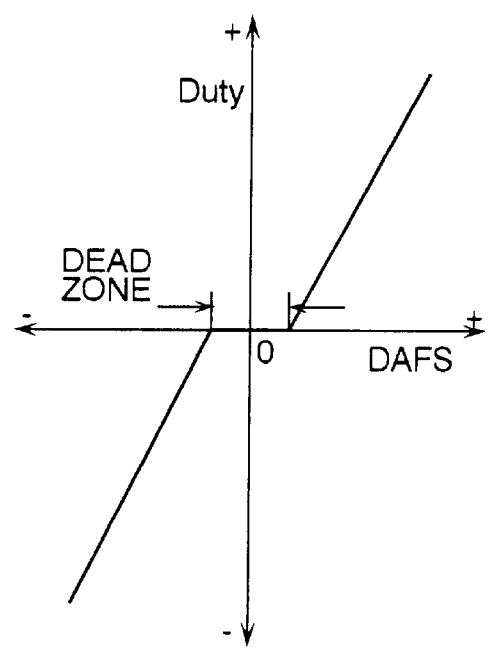
FIG. 5 is a graph showing a dead zone for correction of a feedback control value.

FIG. 5 is a diagram showing a dead zone by way of example in which the difference between actual and target amounts of air Qtgt (which is hereafter referred to as an air amount difference DAFS) is used to enter the horizontal axis and duty ratio for the duty-controlled electromagnetic regulator valve 51 that represents the feedback value (the correction value of valve lift of EGR valve 24) is used to enter the vertical axis. When the air amount difference DAFS is large on the plus side, this indicates that the actual amount of air Qact is too large, then, the correction value (duty ratio) is increased to correctly open EGR valve 24. Conversely, when the an air amount difference DAFS is large on the minus side, this indicates that the actual amount of air Qact is too small, then, the correction value is reduced to correctly close EGR valve 24. When the an air amount difference DAFS is as small as falling within the dead zone, the correction value is unchanged.

In the engine operating region X1 there is a demand for an increase in exhaust gas recirculating amount, the intake air throttle valve 18 is closed so as to provide the smallest effective area of the common intake air passage 12, and the swirl control valve 20 is closed so as to ensure combustibility in conformity with an increase in exhaust gas recirculating amount, thereby intensifying an air stream. Although the target amount of air Qtgt is determined referring to a control map which defines the target amount of air Qtgt with respect, for example, to fuel injection amount Finj and engine speed Sens, it is reduced or changed to a smaller value when the intake air throttle valve 18 is closed. The reducing amount of air Qcrt is determined so as to accord with a drop in the amount of air Qact which is actually caused as a result of closing the intake air throttle valve 18. Specifically, although the largest amount of air that can flows through the common intake air passage 12 becomes smaller with a decrease in opening or valve lift of the intake air throttle valve 18, the reducing amount of air is made equal to a difference of the largest amount of air between when the intake air throttle valve 18 is in the fully closed position provides and when it is in the fully open position.

FIG. 6 is a flow chart illustrating a sequence routine of the exhaust gas recirculation amount feedback control that the control unit 100 implements on the presupposing the foregoing. When the sequence logic commences and control proceeds to a block at step Q1 where the control unit 100 reads in various signals including at least an air flow rate signal Safr from the air flow meter 14, an intake air pressure signal Siap from the intake air pressure sensor 17, an accelerator travel signal Sact from an accelerator travel sensor S1, and an engine speed signal Sens. Subsequently, after determining an amount of fuel injection Finj on the basis of the accelerator travel Sact and the engine speed Sens at step Q2, a decision is made with reference to the engine operating region decision map shown in FIG. 4 at step Q3 as to whether a present engine operating condition falls within the engine operating zone X4 for the feedback control of exhaust gas recirculation. When time present engine operating condition is out of the engine operating zone X1, both intake air throttle valve 18 and swirl control valve 20 are opened at step Q4. Then the step orders return for another implementation of the sequence routine. On the other hand, when present engine operating condition falls within the engine operating zone X1, a decision is further made with reference to the engine operating region decision map at step Q5 as to whether the present engine operating condition falls within the engine operating zone X1. When the present engine operating condition falls within the engine operating zone X1, after closing both intake air throttle valve 18 and swirl control valve 20 at step Q6, a target amount of air Qtgt is calculated by reducing a correction amount (plus value) Qcrt from a basic amount of air Qbsc according to an engine operating condition (the fuel injection amount Finj and the engine speed Sens) at step Q7. The reduction of the basic amount of air Qbsc by the correction amount Qcrt is made to prevent EGR valve 24 from changing the valve lift too small due to a great drop in the actual amount of air Qact which is caused by closing the intake air throttle valve 18. In other words, the correction of the basic amount of air Qbsc is made to prevent an occurrence of a situation where, if no correction of the base target amount is made, EGR valve 24 is finally closed for providing an actual amount of air Qact equal to the target amount of air Qtgt. Subsequently, after setting a narrow dead zone at step Q8, the sequence logic proceeds to a block at step Q12 where an an air amount difference DAFS is calculated. On the other hand, when the present engine operating condition is out of the engine operating zone X1, after fully opening both intake air throttle valve 18 and swirl control valve 20 at step Q9, a basic amount of air Qbsc that is determined according to the engine operating condition is set up as a target amount of air Qtgt at step Q10. Subsequently, after setting a predetermined wide dead zone at step Q11 the sequence logic proceeds to the block at step Q12 for calculation of an air amount difference DAFFS.

After calculating an air amount difference DAFS by subtracting the target amount of air Qtgt from the actual amount of air Qact at step Q12, a decision is subsequently made, at step Q13 as to whether the air amount difference DAFS is so great as to exceed the dead zone. When the air amount difference DAFS is great, a feedback correction value is changed according to the air amount difference DAFS at step Q14 in conformity with the graph as shown in FIG. 5. On the other hand, when the air amount difference DAFS is so small as to exceed the dead zone, a last feedback correction value is held as it is at step Q15. When a feedback correction value is set up at step Q14 or step Q15, the control unit 100 provides the duty-controlled electromagnetic regulator valve 51 with a duty control signal in conformity with the feedback correction value with which the duty-contrclled electromagnetic regulator valve 51 is operated to control EGR valve 24, so as thereby to drive EGR valve 24 at step Q16.

The intake air throttle valve 18 may be of a type that is variable in valve lift in three or more steps or a type that is linearly variable in valve lift. The target air amount is preferred to be changed in steps or linearly according to types of the intake air throttle valve 10. In the case of employing the linearly variable intake valve throttle valve 18, the target air amount may be changed not linearly but in steps or otherwise in desired forms. Biat is to say, the target air amount may be not always in conformity in the form of variation with a type of the intake air throttle valve 18. The manner of varying the target air amount may be made not by directly varying the target air amount but by varying a parameter for determination of the target air amount which results in a change in the target air amount. Further the fuel injection amount may be varied according to a change in the target air amount, i e. a change in valve lift of the intake air throttle valve 18.

The exhaust gas recirculation of the present invention can be employed in engines which are of types other than a direct injection type or engines which are not equipped with a supercharging feature.

Although the present invention has been fully described by way of the preferred embodiment thereof with reference to the accompanying drawings, various variants and other embodiments may occur to those skilled in the art. Therefore, unless otherwise such variants and other embodiments depart from the scope of the invention, they should be covered by the following claims.

What is claimed is:

1. An exhaust gas recirculation control system for an engine which is provided with an intake air throttle valve between an air flow sensor operative to detect an actual amount of air introduced into an intake air passage and an exhaust gas inlet port of the intake air passage through which exhaust gas is admitted into an intake air stream for feedback controlling a recirculation amount of exhaust gas so as to bring an actual amount of intake air to a target amount of air, said exhaust gas recirculation control system comprising:

engine operating condition detecting means for detecting engine operating condition of the engine; and control means for determining a target amount of air according said engine operating condition, changing an operated condition of the intake air throttle valve when said engine operating condition falls in an engine operating region specified for implementation of feedback control of a recirculation amount of exhaust gas, and changing said target amount of air according to said operated condition of the intake air throttle valve.

2. An exhaust gas recirculation system as defined in claim 1, wherein the target amount of air is determined to be small for a smaller valve lift of the intake air throttle valve as compared with a larger valve lift of the intake air throttle valve.

3. An exhaust gas recirculation control system as defined in claim 2, wherein the target amount of air is reduced by an amount of air that occurs due to a reduction in valve lift of the intake air throttle valve.

4. An exhaust gas recirculation control system as defined in claim 1, wherein said control means includes a dead zone relating to a difference between an actual amouErt Of air and a target amount of air in which a feedback control value is corrected.

5. An exhaust gas recirculation control system as defined in claim 4, wherein said dead zone is widened for smaller valve lifts of the intake air throttle valve as compared with larger valve lifts of the intake air throttle valve.

6. An exhaust gas recirculation control system as defined in claim 1, wherein a valve lift of the intake air throttle valve is reduced in a specified engine operating region where an increase in exhaust gas recirculation amount is intended.

7. An exhaust gas recirculation control system as defined in claim 6, wherein the specified engine operating region is predetermined for lower engine speeds or lower engine loads.

8. An exhaust gas recirculation control system as defined in claim 6, wherein the specified engine operating region is predetermined for lower engine speeds and lower engine loads.

* * * * *

UNITED STATES PATENT AND TRADEMARK OFFICE
CERTIFICATE OF CORRECTION

PATENT NO. : 6,289,883 B1  Page 1 of 1
DATED : September 18, 2001
INVENTOR(S) : Shinichi Wakutani et al.

It is certified that error appears in the above-identified patent and that said Letters Patent is hereby corrected as shown below:

<u>Column 9, claim 4,</u>
Line 3, delete "amouErt Of" and insert -- amount of --.

Signed and Sealed this

Twelfth Day of March, 2002

Attest:

Attesting Officer

JAMES E. ROGAN
*Director of the United States Patent and Trademark Office*